United States Patent [19]
Takagi

[11] 3,794,808
[45] Feb. 26, 1974

[54] POWER SUPPLY CIRCUIT FOR A HEATING ELEMENT
[75] Inventor: Susumu Takagi, Tokyo, Japan
[73] Assignee: Yokogawa-Hewlett-Packard Ltd., Tokyo, Japan
[22] Filed: Aug. 2, 1972
[21] Appl. No.: 277,203

[30] Foreign Application Priority Data
  Aug. 5, 1971 Japan.................. 46-59261

[52] U.S. Cl.................... 219/497, 219/494
[51] Int. Cl....................... H05b 1/02
[58] Field of Search...... 219/497, 494, 501; 307/33, 307/34; 323/DIG. 1, 19, 22 T, 24; 321/2, 16, 18

[56] References Cited
UNITED STATES PATENTS
3,588,666  6/1971  Bertolini et al................. 307/33
3,432,737  3/1969  Hunter et al.................... 321/2

FOREIGN PATENTS OR APPLICATIONS
262,286  1/1970  U.S.S.R................. 219/497
801,194  12/1968  Canada.................. 219/497

Primary Examiner—Bernard A. Gilheany
Assistant Examiner—F. E. Bell
Attorney, Agent, or Firm—A. C. Smith

[57] ABSTRACT

An improved high-efficiency power supply for a heating element includes charge, discharge, and comparator circuits. The comparator circuit provides the proper duty cycle and controls the power to the heater for keeping its temperature nearly constant over a wide range of input voltages. Changing the value of the components of the charge and discharge circuits alters the power supplied to the heating element.

3 Claims, 3 Drawing Figures

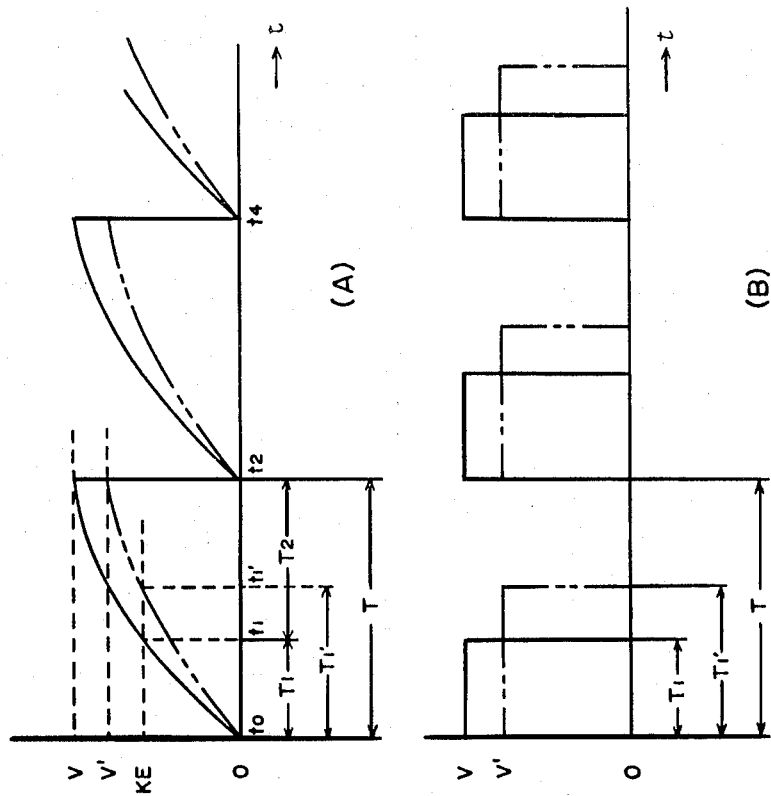
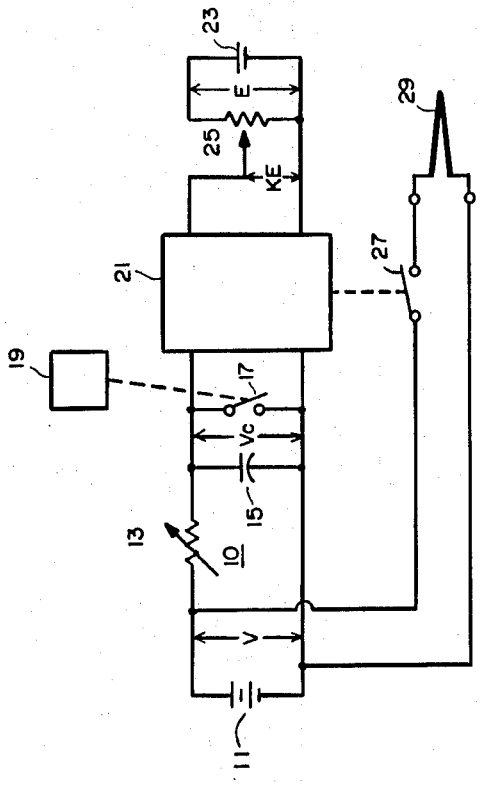
FIG.1
FIG.2

POWER SUPPLY CIRCUIT FOR A HEATING ELEMENT

BACKGROUND AND SUMMARY OF THE INVENTION

Previously, power supply circuits for heating elements maintained constant power to the heating element by using a series regulator. These circuits had low efficiencies because the supplied power used in the heating element was dissipated in the series regulator.

The limitations on the series regulator that maximum desired heating power must be supplied under minimum supply voltage, and that the power for a heating element be several watts caused difficulties. In battery powered devices, the power dissipated in the series regulator shortens the operating time.

Accordingly, one aspect of the present invention is that it utilizes the full supply voltage. Power to the heating element is controlled by automatically changing the duty cycle to corres-pond with changes in the supply voltage.

A resistor and a capacitor, either or both of which may be variable, allow selection of the desired heating power. The resistor and capacitor are connected in series with the power supply. A switch is inserted in parallel with the capacitor to discharge the charge on the capacitor periodically.

A comparator circuit compares the voltage applied to the capacitor with a reference voltage and provides an ON-OFF signal to the heater.

DESCRIPTION OF THE DRAWINGS

FIG. 1 is a schematic diagram of the preferred embodiment of the power supply circuit for a heating element.

FIG. 2 is two graphs. FIG. 2(A) shows the operating voltage waveforms applied to the capacitor, while FIG. 2(B) shows the corresponding power supplied to the heater in the circuit of FIG. 1.

DESCRIPTION OF THE PREFERRED EMBODIMENT

Figure 3:
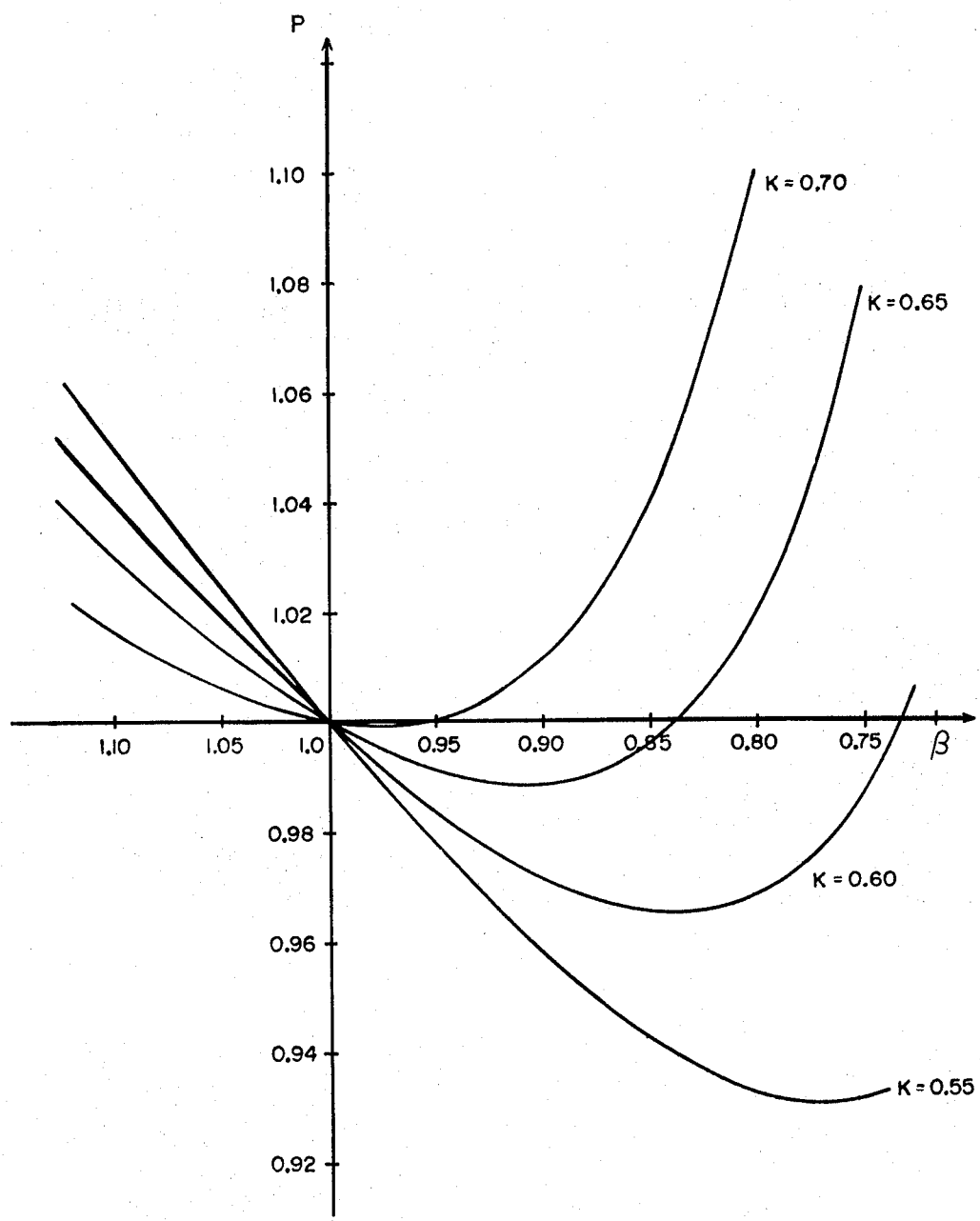
FIG. 3 is a graph showing the variation of power regulation ratio in the circuit of FIG. 1 with changes in supply voltage.

Referring now to the schematic diagram of FIG. 1, there is shown a preferred embodiment of the power supply circuit for a heating element. A variable resistor 10 and a capacitor 15 are connected in series to a power supply 11 for the heating element 29. Switch 17 which may be of various constructions including mechanical and electronic is connected in parallel with the capacitor and is opened and closed periodically with constant time interval (T) by a switch driver 19. Switch driver 19 may be a multivibrator or other well known circuit. Closing the switch 17 discharges the capacitor 15. A comparator circuit 21 compares the voltage Vc applied to the capacitor with a reference voltage KE. Voltage comparator circuits are also well known and commonly used. KE is supplied by a constant voltage supply 23 of voltage E and a potentiometer 25. A switch 27 is connected in series with the heating element 29 and the power supply 11. Switch 27 is driven by the output of the comparator circuit. The state of switch 27 is as follows:

$Vc \leq KE$ — Switch 27 ON $Vc > KE$ — Switch 27 OFF

In operation, the voltage of the capacitor Vc in the circuit of FIG. 1 goes up to the supply voltage V with time constant RC where R is the resistance of resistor 13, and C is the capacitance of capacitor 15. After the lapse of the constant time interval T following closure of switch 17 at time $t_0$, Vc is driven to zero voltage level. The effect of the closure of switch 17 is illustrated in FIG. 2. The comparator circuit compares the voltage Vc with the reference voltage KE and closes the switch 27 until Vc reaches KE at time $t_1$.

Accordingly, $T_1$ (which is $t_1-t_0$) is shown in equation (1) below:

$$T_1 = -CR \log_{10}(1 - KE/V) \quad (1)$$

$T_1$ is proportional to the ON time of the switch in periodical constant time interval T. Therefore, the average heating power P is shown in equation (2) subject to the condition that the heating element has constant resistance.

$$P \quad V^2 (T_1/T) \quad V^2 T_1 \quad (2)$$

Using equation (1) and (2), equation (3) is derived.

$$P \quad -CRV^2 \log(1 - KE/V) \quad (3)$$

Defining a parameter beta ($\beta$) as:

$$V = \beta E \quad (4)$$

the heating power regulation ratio versus change in supply voltage in the circuit of FIG. 1 can be expressed as:

$$P = \beta^2 \log(1 - K/\beta)/\log(1 - K) \quad (5)$$

The heating power regulation ratio P is shown in FIG. 3 as a function of both $\beta$ and K.

FIGS. 2(A) and 2(B) also illustrate the effect of changes in the power supply voltage V. If V' is the new voltage from power supply 11, then $t_1'$ is the time when the voltage applied to the capacitor is equal to the reference voltage KE while $T_1' = t_1' - t_0$.

From FIG. 3, it can be seen that very nearly constant power regulation for the heating element is obtainable with the proper values of K and E, i.e., proper reference voltage. From equation (3), it is evident that this invention permits variations in the heating power setting by changing the values of capacitance and resistance in the charge and discharge circuits.

I claim:

1. A power supply for a heating element comprising:

a heating element;
a power source for energizing the heating element;
a first switch means for repetitively connecting and disconnecting with a controllable duty cycle the heating element and the power source;
means for generating a substantially constant reference voltage;

sampling means for sampling the voltage of the power source; and a comparator means for comparing the sampled voltage from the power source with the constant reference voltage and increasing the duty cycle of the first switch means in response to decreases in sampled voltage from the power source relative to the constant reference voltage and for decreasing the duty cycle of the first switch means in response to increases in sampled voltage from the power source relative to the constant reference voltage.

2. A power supply as in claim 1 wherein said comparator means includes:

a resistor and a capacitor serially connected with said power source;

second switch means connected across the capacitor;

means for recurringly actuating the second switch means to discharge the capacitor; and comparator means for comparing the voltage across the capacitor with that of the constant reference voltage, for closing said first switch means in response to the voltage across the capacitor being not greater than the constant reference voltage, and for opening said first switch means in response to the voltage across the capacitor being greater than the constant reference voltage.

3. A power supply as in claim 1 wherein said constant electrical power source means includes a variable voltage divider connected across a constant voltage supply.

* * * * *

UNITED STATES PATENT OFFICE
CERTIFICATE OF CORRECTION

Patent No. 3,794,808       Dated February 26, 1974

Inventor(s) Susumu Takagi

It is certified that error appears in the above-identified patent and that said Letters Patent are hereby corrected as shown below:

Column 2, line 24, Equation (2) should read:

$$P \propto V^2 (T_1/T) \propto V^2 T_1$$

Column 2, line 29, Equation (3) should read:

$$P \propto -CRV^2 \log(1 - KE/V)$$

Signed and sealed this 18th day of June 1974.

(SEAL)
Attest:

EDWARD M. FLETCHER, JR.
Attesting Officer

C. MARSHALL DANN
Commissioner of Patents